United States Patent [19]
Guarino

[11] Patent Number: 5,863,576
[45] Date of Patent: *Jan. 26, 1999

[54] VACUUM PACKED MICROWAVEABLE LOBSTER PACKAGE AND PROCESS

[75] Inventor: Nicholas A. Guarino, Roatan, Honduras

[73] Assignee: Carnival Brand Seafood Company, Fort Lauderdale, Fla.

[*] Notice: The term of this patent shall not extend beyond the expiration date of Pat. No. 5,817,353.

[21] Appl. No.: 731,596

[22] Filed: Oct. 15, 1996

Related U.S. Application Data

[63] Continuation-in-part of Ser. No. 637,610, Apr. 25, 1996.

[51] Int. Cl.⁶ ................................................. B65B 29/08
[52] U.S. Cl. ...................... 426/107; 426/113; 426/124; 426/129; 426/234; 426/393; 426/396; 426/412; 206/778; 53/434; 53/449
[58] Field of Search .................... 426/107, 114, 426/234, 129, 412, 396, 393, 113, 124; 206/778, 784; 53/434, 449, 444, 445

[56] References Cited

U.S. PATENT DOCUMENTS

| | | | |
|---|---|---|---|
| 2,674,536 | 4/1954 | Fisher | 426/114 |
| 2,776,215 | 1/1957 | Thomas | 426/396 |
| 2,776,216 | 1/1957 | Thomas | 426/396 |
| 2,850,391 | 9/1958 | Gunsberg | 426/113 |
| 2,920,968 | 1/1960 | Grandy | 426/129 |
| 3,012,894 | 12/1961 | Nagel | 426/113 |
| 3,152,915 | 10/1964 | Cover et al. | 426/393 |
| 3,271,169 | 9/1966 | Baker et al. | 426/114 |
| 3,587,839 | 6/1971 | Von Brecht | 426/129 |
| 3,692,545 | 9/1972 | Moore | 426/129 |
| 3,780,196 | 12/1973 | Domecki | 426/393 |
| 3,864,503 | 2/1975 | Steenolsen | 426/412 |
| 3,895,120 | 7/1975 | Backus | 426/129 |
| 3,912,823 | 10/1975 | Kane | 426/129 |
| 4,081,646 | 3/1978 | Goltsos | 426/107 |
| 4,133,896 | 1/1979 | Standing et al. | 426/113 |
| 4,141,487 | 2/1979 | Faust et al. | 426/113 |
| 4,230,729 | 10/1980 | Hoelzel | 426/129 |
| 4,425,368 | 1/1984 | Watkins . | |
| 4,456,164 | 6/1984 | Foster et al. . | |
| 4,529,089 | 7/1985 | Gasbarra et al. | 426/113 |
| 4,571,337 | 2/1986 | Cape et al. . | |
| 4,798,728 | 1/1989 | Sugisawa et al. | 426/129 |
| 4,801,077 | 1/1989 | Sweat et al. | 229/125.19 |
| 4,835,942 | 6/1989 | Skrmetta | 426/107 |

(List continued on next page.)

FOREIGN PATENT DOCUMENTS

| | | | |
|---|---|---|---|
| 479968 | 1/1952 | Canada | 426/107 |
| 374071 | 6/1990 | European Pat. Off. | 426/129 |
| 1258357 | 2/1960 | France | 426/129 |
| 2483190 | 12/1981 | France | 426/129 |
| 58-98058 | 6/1983 | Japan | 426/129 |
| 60-234539 | 5/1984 | Japan | 426/129 |
| 59-1206253 | 6/1984 | Japan | 426/129 |
| 62-244340 | 10/1987 | Japan | 426/113 |
| 63-254964 | 10/1988 | Japan | 426/113 |
| 63-283558 | 11/1988 | Japan | 426/393 |
| 2-60579 | 3/1990 | Japan | 426/234 |
| 6-78720 | 3/1994 | Japan | 426/412 |
| 2199235 | 7/1968 | United Kingdom | 426/113 |
| 2121752 | 1/1984 | United Kingdom | 426/412 |

OTHER PUBLICATIONS

Modern Packaging 1/55 pp. 79, 160, 162 426/129.

*Primary Examiner*—Steven Weinstein
*Attorney, Agent, or Firm*—Quarles & Brady

[57] ABSTRACT

Packaging for lobster, within which the product may be microwaved, including the use of pallet structure for positioning the lobster within the packaging to avoid penetration of the plastic wrapping film by shell structure. The packaging is vacuum sealed, flash frozen and distributed to be subsequently microwaved without rupture of the packaging until after microwaving.

19 Claims, 3 Drawing Sheets

U.S. PATENT DOCUMENTS

| | | | |
|---|---|---|---|
| 4,839,180 | 6/1989 | Standerwick et al. | |
| 4,857,342 | 8/1989 | Kappes | 426/113 |
| 4,862,791 | 9/1989 | Baughey | 426/113 |
| 4,873,101 | 10/1989 | Larson et al. | |
| 4,898,743 | 2/1990 | Ross et al. | 426/113 |
| 4,933,526 | 6/1990 | Fisher et al. | |
| 4,948,605 | 8/1990 | Lambert, Jr. | |
| 4,954,356 | 9/1990 | Kappes | |
| 4,964,507 | 10/1990 | Chen | 426/129 |
| 5,044,777 | 9/1991 | Watkins et al. | |
| 5,085,879 | 2/1992 | Elbar | 426/129 |
| 5,164,211 | 11/1992 | Comer | 426/129 |
| 5,247,149 | 9/1993 | Peleg | |
| 5,256,434 | 10/1993 | Conway | 426/129 |
| 5,345,069 | 9/1994 | Grindrod | |
| 5,377,855 | 1/1995 | Cook et al. | 426/129 |
| 5,431,938 | 7/1995 | Kou | |
| 5,457,939 | 10/1995 | Bardou | |
| 5,473,866 | 12/1995 | Maglecic et al. | |

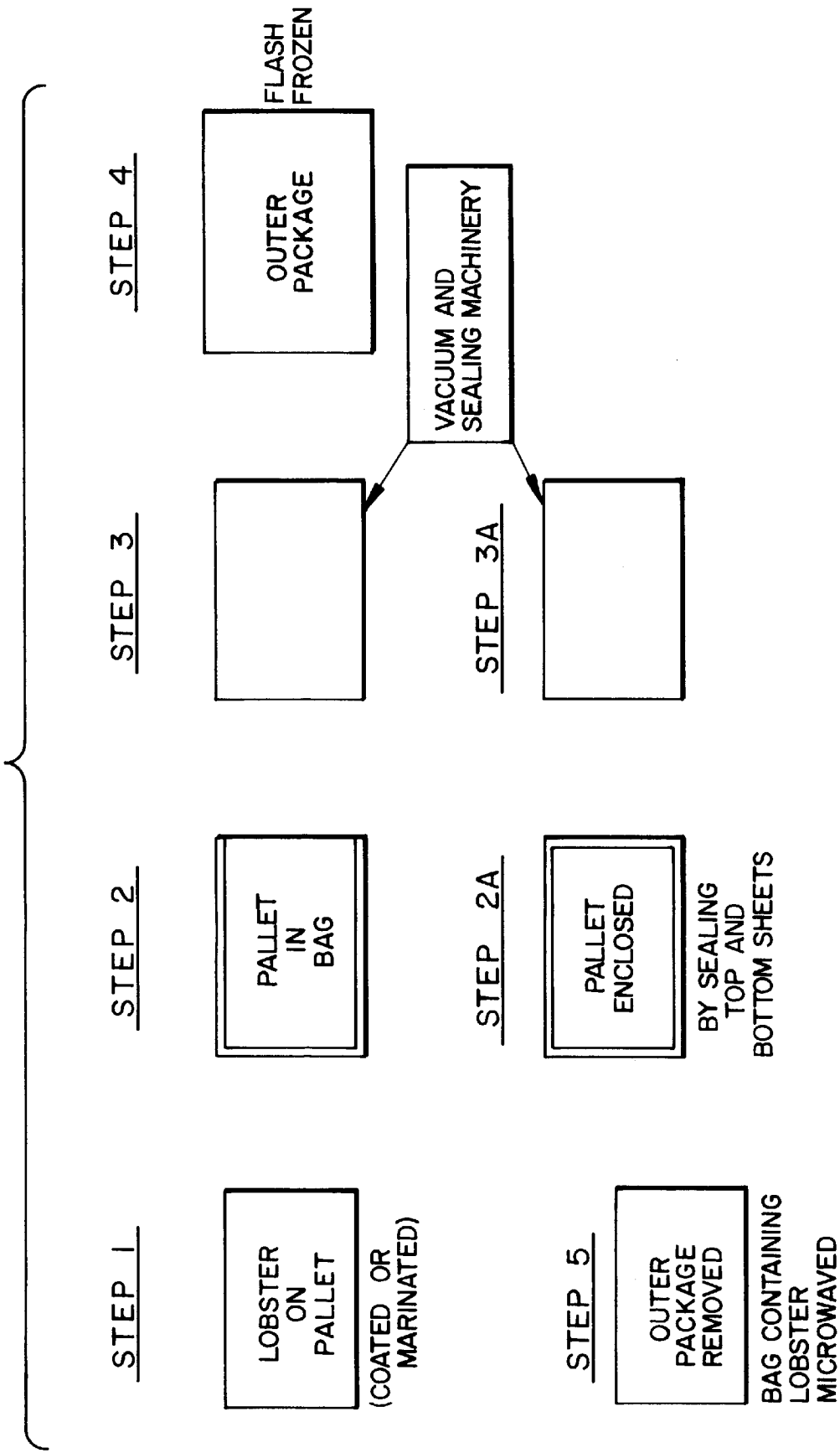

VACUUM PACKED MICROWAVEABLE LOBSTER PACKAGE AND PROCESS

CROSS-REFERENCE TO RELATED APPLICATION

This application is a continuation-in-part of U.S. Ser. No. 08/637,610, filed Apr. 25, 1996.

BACKGROUND OF THE INVENTION

Heretofore, packaging of lobster in buyer-friendly containers having a good visibility of the product has been virtually unknown as the shells of the lobster by virtue of their shape and shells made it inappropriate to vacuum seal the product in marketable packaging for retail use. It has not been previously known to have a lobster product that could be microwaved in the same container as packaged.

With vacuum packaging of lobster, there has been past concern with the potential of mold, yeast, bacteria, especially botulism. Processes have been tried before with other seafood to eliminate the threat of botulism. Examples of such processes are nitrogen flushing and radiation. Notwithstanding these attempts success has not previously been obtainable, with packaging lobster because of problems associated with the integrity of the packaging leading to health issues such as botulism.

Further, with prior packaging, consumers have not been able to microwave lobster in its shipping and sales package. Such product could not be found in the marketplace.

An example of vacuum packaging technique of food stuffs generally is found in U.S. Pat. No. 5,473,866. A seafood vacuum pack system is disclosed in U.S. Pat. No. 4,835,942 but this patent teaches away from the subject invention by virtue of a stacking technique used at the periphery of the packages. Likewise, U.S. Pat. No. 4,964,507 teaches the use of a "protruding-up curved section" of a case which is also contrary to the subject invention.

SUMMARY OF THE INVENTION

Accordingly, the subject invention is directed to packaging which permits the vacuum packaging of lobster to enable the packaged product to be presented to consumers in attractive packaging while maintaining the integrity of the vacuum packaging. Thus, a better packaged product than in the past is provided and one in which the lobster can be successfully microwaved without removal. For aesthetic, packaging, and microwaving reasons, the lobster is packed side by side or one to a package in carefully presented flat orientation which enables the product to be successfully vacuum-packed in the first instance, and subsequently microwaved without removal until completion of the microwaving at which time the package is for the first time ruptured and the contents removed. While some prior patents disclose various designs which promote venting of the package doing microwaving, the subject package maintains its integrity until the microwaving is completed, at which time the package is ruptured for the first time.

It is therefore an object of the subject invention to provide a vacuum packaging process and the packaging to enable lobster in the shell to be safely packaged, and subsequently microwaved in the same package.

It is a further object of the subject invention to provide a process and packaging to present lobster to the consumer in retail packaging heretofore unknown to the consumer, which packaging then forms a container for microwaving the product, which container remains sealed until the microwave process is completed.

It is a related object to provide a process by which lobster is flat packed, flash frozen, and distributed, to be subsequently microwaved in the same container by the purchaser.

It is still a further object of the subject invention to provide lobster in desirable packaging to promote favorable product appearance and to facilitate utilitarian objectives, including the ability to microwave the lobster within the same packaging.

It is one more object of the subject invention to develop a packaging process whereby concerns of spoilage, botulism, mold, yeast, and bacteria are effectively minimized and to maintain lobster in ready condition for microwaving at a moment's notice at any time.

It is still another object of the subject invention to provide a process and packaging of lobster in a cost efficient manner wherein the package itself becomes a container for microwaving.

It is one more object of the subject invention to provide a process and packaging to permit the packaging of lobster so as the product can be carefully inspected by the consumer upon purchase.

In compliance with the above objects, lobster are vacuum packed as follows. The lobster are placed on a pallet in a basically flat side by side orientation, or one to a package. It is important that this flat side by side orientation be maintained, because otherwise the lobster may shift or twist creating undo pressure on the package and breaking the vacuum seal, which will have a detrimental effect on the condition of the product.

In the preferred embodiment, a pallet of very specific design is used. One side of the pallet is matted or rough so as to help secure the lobster in precise orientation and retard sliding or shifting of the lobster. The other side of the pallet is smooth so as to facilitate the handling and in particular the packaging, as the pallet can be easily slid into a bag or otherwise positioned prior to the step of vacuum sealing the lobster. The matted or roughed side of the pallet may also be coated with a reflective material which promotes microwaving buts which is not so reflective that it becomes detrimental to the microwaving process.

The pallet also may have raised sides which help to protect the package. The sides help, as the vacuum sealing takes place so the lobster are insulated from direct contact from the sides of the packaging to prevent puncturing. The sides are a potential stressed area as the covering bag fits fairly tightly around the lobster.

Once the lobster are placed on the pallet and the pallet is positioned within the bag of plastic film, preferably clear, the vacuum sealing can take place with somewhat standard and well-known equipment. Typically a vacuum means will draw a vacuum within the filled bag and a seal jaw assembly will heat seal the bag once the air is evacuated. The vacuum-heat sealing equipment is not part of the subject invention.

The sealed bag with lobster contained within can then be placed in an outer package, preferably of cardboard, which will stabilize the bag within and help to hold the lobster in a desired orientation. The outer package is designed for retail acceptance and will likely include a window so that the lobster may be examined within the inner package. This outer package may be removed when microwaving takes place.

The lobster may also be marketed in the sealed clear bag without the outer package. Sales information can be placed on the bottom of the pallet, which will be seen through the transparent bag material, or on the bag itself.

Regardless of the use or not of the outer package during the packing process, the lobster are placed on the pallet in a nonfrozen state and upon being packed as disclosed herein, are immediately flash frozen, using any of several commercial techniques, such as, but not limited to, blast freezing, contact freezing or tunnel freezing, and marketed in such frozen state.

It is contemplated that the packaged lobster remain in a frozen state through distribution, retail, etc. until approximate time of consumption. The packaged lobster can then be placed in a microwave unit. The bag or package had been designed to retain its integrity through the microwaving process and will not rupture during the process. As the frozen product is thawed, the resulting locked-in moisture will provide the basis for steaming the lobster within the bag or package which will then be removed by rupturing the bag and served for consumption.

BRIEF DESCRIPTION OF THE DRAWINGS

FIG. 4 shows the steps of the process by which the lobster is packaged and subsequently microwaved according to the steps of the subject invention.

DETAILED SPECIFICATION

Figure 1:
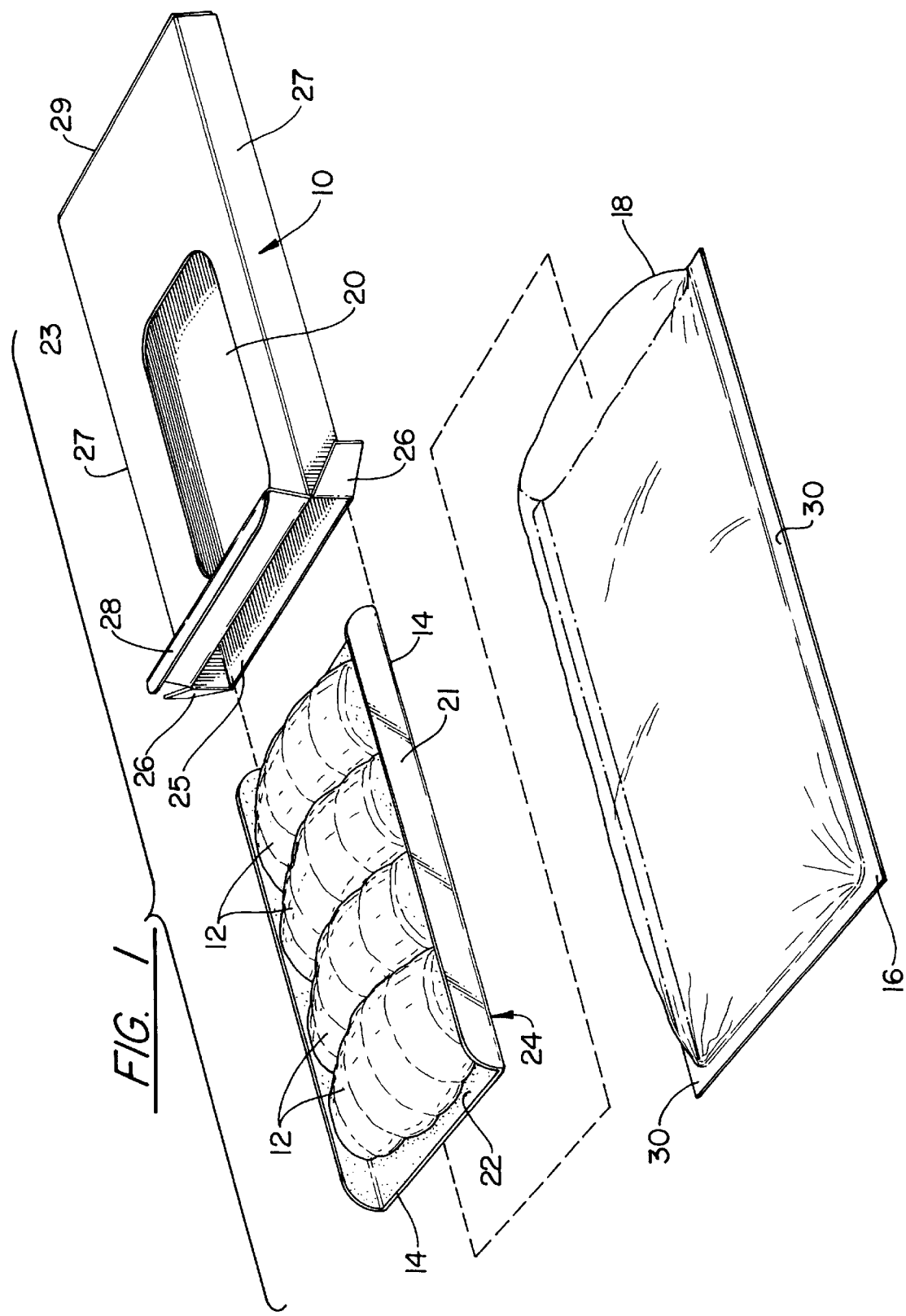
FIG. 1 is a sequential perspective view showing lobster on a pallet, the inner packaging to cover and seal the lobster and the outer container to receive the packaged lobster.

For lobster to be packaged in the package 10 as shown in FIG. 1, lobster 12 are first carefully positioned on a pallet 14 side by side with shell up as shown. The pallet 14 will then be inserted into the transparent envelope of packaging 16 as shown and slid within, at which time vacuum will be applied and the envelope or bag-like container 16 will be sealed by the processing equipment. More specifically, a vacuum is created ash vacuum means (not shown) causes the air to be sucked from within prior to the sealing of the end 18 of bag 16 as is standard in vacuum packaging of food stuffs. The lobster 12 are shown within their shells. The lobster 12 may be one to a bag or placed sides by side either widthwise or lengthwise depending on size.

The envelope or bag 16 containing the lobster 12 is now ready to be placed within the outer package or container 10, having window or opening 20 for inspection of the lobster 12.

It is important for salability that the lobster 12 be packaged with the shells on and that the pallet 14 maintains alignment of the lobster 12 to prevent penetration of the envelope 16 by sharp edges of or pressure from the shells. Also, the lobster 12 need to maintain a side by side orientation as opposed to piling up to be subsequently successfully microwaved which is an important aspect of the present invention. Specifically, the pallet 14 may be constructed of plastic with some rigidity which helps the lobster 12 to be positioned so there is no turning, sliding, twisting, piling up or other disorientation of the lobster 12 that would bring sharp shell edges into contact with the protective film or envelope 16 or create other undo pressure. If the envelope 16 is punctured, storage problems can result and the ability to subsequently microwave the product in its bag 16 will be compromised as well. The bag 16 may be of 2-ply construction comprised of polypropylene and nylon, with the polypropylene enabling it to tolerate temperature extremes and the nylon contributing to its strength. Equivalent material may also be used.

Also, as shown in FIG. 1, the pallet 14 may have side structure 21 which will help to keep the desired orientation of the lobster 12 and help to prevent puncturing of the envelope 16 In particular, as the package, envelope or bag 16 is sealed and then inserted into nonsealed outer package 10, stress points might exist along its sides and the pallet side structure 21 helps to protect the bag seal by acting as a buffer between the lobster 12 and the sides of bag 16. The bag as sealed will be very tight across the top of lobster 12, to help hold them in a side by side orientation.

Upon further examination of FIG. 1, the pallet 14 will be seen to have two very different surfaces. The top surface 22 on to which the lobster 12 will be positioned, may be matted or roughened to also prevent the lobster 12 from shifting and to prevent the penetration of the plastic film structure of envelope 12 and to provide suitable orientation of the product for microwaving.

The top surface 22 of the pallet 14 may also be coated with a reflective coating to facilitate microwaving once the envelope 16 is inserted into a microwave unit prior to consumption. The coating, thanks to the roughness of the surface, will not be a detriment to microwaving as the waves will not be directed back to the microwave source due to the roughness which creates something less than direct reflection. The coating can be a reflective foil which may be gold in color.

The bottom surface 24 is smooth, as best seen on the sides 21 which are turned up at an approximate 90 degree angle. The smoothness facilitates the handling of the pallet 14 and, in particular, the sliding of the pallet 14 within envelope 16 prior to the vacuum sealing of the envelope by sealing edge or end 18.

As can further be seen in FIG. 1, once the lobster 12, on pallet 14, are placed within bag 16 and sealed, the bag 16 is placed within outer package or container 10, which is preferably made of cardboard or substitute. The container or cardboard box 10 basically has a top 23 and bottom 25 portion, sides 27, and ends 29. The opening 20 in top portion 23 is cut in such a way to enable the product within to be viewed.

Once the bag or package 16 is placed within outer package or container 10, the container 10 is closed by tucking in side flaps 26 and end flap 28.

Figure 2:
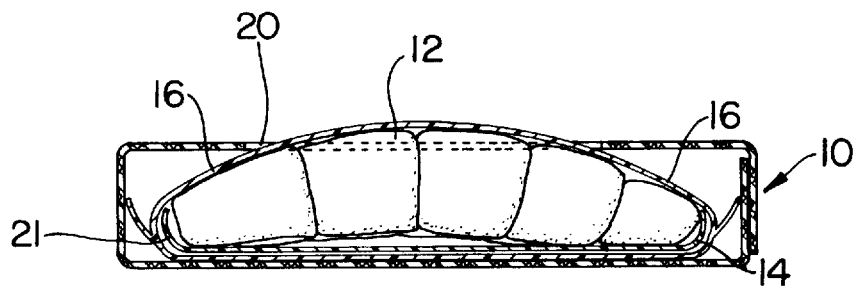
FIG. 2 is a cross-section view taken along the lines 3—3 with the lobster inserted in the package in FIG. 1.

As can be seen in FIG. 2, packaged lobster 12 are shown extending slightly upward through opening 20 by virtue of their shell configuration but still sealed within bag 16 as the frozen lobster are presented for sale in commercial establishments such as grocery chains. The packages 10 will typically be stacked within freezer compartments to present an attractive product for the purchasers.

Figure 3:
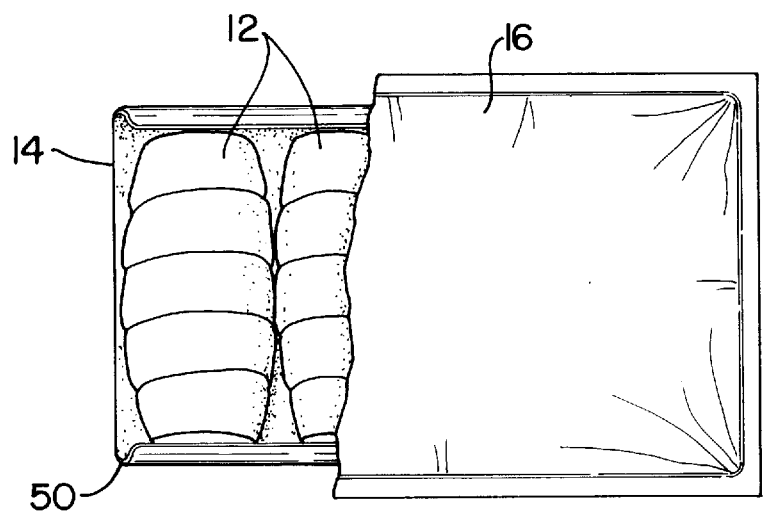
FIG. 3 is a top view of the lobster within the inner packaged shown cutaway with no outer carton.

With reference to FIG. 3, the packaged lobster 12 are seen within package or bag 16. The lobster 12 may be marketed within bag 16 without the use of the outer package 10. Sales indicia may be placed on bag 16 or within the bag 16 by using an insert Sales information can be placed on the bottom of pallet 14 as well.

With reference to FIG. 4, the key steps of the process from packing to microwaving are presented. In Step 1, the lobster 12 are placed on the pallet which may be substantially like pallet 14 of FIG. 1 except without sides 21. The lobster 12 may be placed on pallet 14 by hand, machine (not shown), or by a combination of both. It is important that they lie side by side with shells facing upward, i.e., not stacked on one another. The risk of the lobster shell or tail structure penetrating the envelope 16 is increased if this orientation is lost.

The pallet 14 is then to be enveloped into bag 16 as shown in Step 2. If three sides of the bag are sealed already, as shown in Step 2 and in FIG. 1, the pallet 14 is pushed into the bag 16 as facilitated by the smooth surface 24 of the bottom of pallet 14. Either machine or a by-hand process may be used in placing the pallet 14 within the bag 16.

As shown in Alternative Step 2, the pallet 14 may be slid onto a bottom sheet of plastic film and another sheet placed on top. Either sheets extending from rolls or discrete sheets can be used. The edges of top and bottom sheets will be joined together and heat sealed simultaneously with the vacuuming of the then-formed bag as represented in Step 3A.

As contemplated in Step 3, machinery well-known in packaging food stuffs can be used to create a vacuum within bag 16, sealing edge 18 in the process.

Alternatively, as shown in Step 3A and discussed above, the top and bottom sheets can be sealed on four sides, preferably by: a standard heat sealing process as part of the vacuum process. The vacuum is applied before the four edges are sealed to create the vacuum packed lobster within package or bag 16.

In Step 4 the sealed bag or package 16 is placed within box or outer package 10 and the flaps 26, 28 as shown in FIG. 1, closed to complete the packing process. Step 4 can be conducted by hand or by machine, with the latter process being undertaken by packing machinery well known in the food stuffs industry.

At this juncture the packaged lobster is immediately subjected to flash freezing to preserve the quality and to prevent the formation of bacteria, mold, and yeast and botulism thus enabling the product to be shipped and sold in frozen form with greatly increased shelf life. Standard industry equipment is used such as to blast freeze, contact freeze or tunnel freeze the product.

It is contemplated that the lobster 12 will remain frozen until approximate time of consumption. This typically will be through distribution, retail storage and home or restaurant storage. As shown in Step 5, the package, bag or envelope 16 is to be removed from the outer package 10 and placed in its sealed condition in a microwave unit. The lobster 12 will be effectively steamed as the package or bag 16 is designed to withstand the pressure of the steaming process with the bag 16 effectively becoming a pressure cooker. The lobster 12 will thee be ready for consumption as the steam penetrates into the lobster, effectively steaming the product. The length of time of microwaving depends on the characteristics of the microwave unit that is used. Generally, it is contemplated that time of microwaving will be approximately ten minutes depending on wattage of the microwave unit.

Viewing the overall steps from packing to microwaving, the lobster are vacuum packed in a negative pressure situation prior to flash freezing which does not effect the negative pressure within which the lobster are packed. Subsequently, upon microwaving, the expanding steam turns the package or bag 16 effectively into a pressure vessel with the bag 16 being designed to withstand the necessary pressure created during microwaving.

A variety of improvements and modifications to the packaging and process disclosed herein will be apparent. Accordingly, no limitation on the invention is intended by the foregoing description and drawings.

What is claimed is:

1. A process for packaging lobster, comprising the steps of:
    placing lobster in an ordered arrangement on a pallet;
    sliding said palletized lobster into a microwaveable bag to enclose the palletized lobster;
    applying a vacuum to the bag and the palletized lobster;
    sealing the bag and the enclosed palletized lobster under said vacuum; and then,
    flash freezing said sealed bag,
    wherein said pallet has a rough upper surface sufficient to restrain movement of said lobster and a smooth under surface sufficient to facilitate entry of said pallet into said bag, said lobster being placed on said rough upper surface and said ordered arrangement being such that the likelihood of the bag being penetrated or pierced by any parts of the lobster that is capable of doing so is diminished.

2. The process of claim 1, wherein said bag is sealed except for an opening through which the pelletized lobster is inserted prior to the applying and sealing steps.

3. The process of claim 1, wherein the step of flash freezing is carried out by blast freezing the packaged lobster.

4. The process of claim 1, including the further step of placing the sealed bag within an outer carton, said package being adapted for removal of said sealed bag from said outer carton prior to microwaving.

5. The process of claim 1, comprising the further step of microwaving the packaged lobster in the sealed bag, the bag forming a pressure cooker without venting, and such that moisture is retained. within the sealed bag, until the microwaving step is completed.

6. The process of claim 5, further including the steps of opening the bag upon completion of the microwaving step and removing the microwaved lobster.

7. A vacuumized lobster package, comprising:
    a pallet;
    lobster positioned on said pallet in an ordered arrangement;
    a sealed microwaveable bag enclosing said palletized lobster under vacuum; and,
    an outer container enclosing said sealed bag, said package being adapted for removal of said sealed bag from said outer container prior to microwaving,
    wherein said pallet has a rough upper surface sufficient to restrain movement of said lobster and a smooth under surface sufficient to facilitate entry of said pallet into said bag, said lobster being positioned on said rough upper surface and said ordered arrangement being such that the likelihood of the bag being penetrated or pierced by any part of the lobster that is capable of doing so is diminished.

8. The package of claim 7 wherein the pallet further comprises upstanding side walls.

9. The package of claim 7 wherein said outer container has a viewing opening.

10. The package of claim 7 wherein the rough upper surface has reflective characteristics.

11. The package of claim 10, wherein the rough upper surface of the pallet is covered with a reflective foil.

12. The package of claim 11, wherein the reflective foil is gold foil.

13. The package of claim 7, wherein the outer container is a cardboard box.

14. The package of claim 7, wherein the lobster are positioned in a specific shell-up orientation in the ordered arrangement on the pallet and the pallet has upwardly extending sides.

15. A vacuumized lobster package, comprising:

a pallet;

lobster positioned on said pallet in a flat orientation;

a sealed microwaveable bag enclosing said palletized lobster under vacuum; and, an outer carton enclosing said sealed bag, said package being adapted for removal of said sealed bag from said outer carton prior to microwaving, wherein said pallet has a rough upper surface sufficient to restrain movement of said lobster, a smooth under surface sufficient to facilitate entry of said pallet into said bag, and upstanding side walls for restraining said lobster, said lobster being positioned in the flat orientation on said rough upper surface such that the likelihood of the bag being penetrated or pierced by any part of the lobster that is capable of doing so is diminished, said outer carton having an opening for inspecting said lobster within the vacuumized bag.

16. The package of claim 15, wherein the lobster are positioned side by side on the pallet in the flat orientation.

17. A process for packaging lobster, comprising the steps of:

placing lobster on a pallet in a flat orientation;

placing the palletized lobster on a lower sheet of plastic film;

placing an upper sheet of plastic film so that the extremities of the lower and upper sheets extend beyond the perimeter of the pallet and contact one another; and then, applying vacuum and sealing the upper and lower sheets to each other to seal the palletized lobster under vacuum between the sealed sheets, said vacuum sealed palletized lobster being microwaveable and wherein said pallet has a rough upper surface sufficient to restrain movement of said lobster and a smooth under surface sufficient to facilitate sliding said pallet onto said lower sheet, said lobster being positioned in the flat orientation on said rough upper surface such that the likelihood of the sheets being penetrated or pierced by any part of the lobster that is capable of doing so is diminished.

18. The process of claim 17 comprising the further step of placing the sealed palletized lobster in an outer carton having an opening for viewing the vacuum sealed lobster, said package being adapted for removal of said sealed bag from said outer carton prior to microwaving.

19. A process for packaging lobster, comprising the steps of:

placing lobster in an ordered arrangement on a pallet;

placing the palletized lobster on a lower sheet of plastic film;

placing an upper sheet of plastic film so that the extremities of the lower and upper sheets extend beyond the perimeter of the pallet and contact one another; and then, applying vacuum and sealing the upper and lower sheets to each other to seal the palletized lobster under vacuum between the sealed sheets which form a sealed bag, said sealed bag being microwaveable flash freezing said sealed bag, wherein said pallet has a rough upper surface sufficient to restrain movement of said lobster and a smooth under surface sufficient to facilitate entry of said pallet into said bag, said lobster being placed on said rough upper surface and said ordered arrangement being such that the likelihood of the bag being penetrated or pierced by any parts of the lobster that is capable of doing so is diminished.

* * * * *